United States Patent [19]

Minchak

[11] 4,262,103
[45] Apr. 14, 1981

[54] HYDROCARBON-SOLUBLE COPOLYMERS OF BICYCLOHEPTENES AND 1,3-BUTADIENE

[75] Inventor: Robert J. Minchak, Parma Heights, Ohio

[73] Assignee: The B. F. Goodrich Company, Akron, Ohio

[21] Appl. No.: 857,549

[22] Filed: Dec. 5, 1977

[51] Int. Cl.$^3$ .................. C08F 232/08; C08F 232/04; C08F 4/22; C08F 236/06
[52] U.S. Cl. ................................ 526/114; 526/137; 526/138; 526/142; 526/153; 526/169; 526/281; 526/283
[58] Field of Search ............... 526/114, 153, 281, 283, 526/137, 169, 138, 142

[56] References Cited

U.S. PATENT DOCUMENTS

| | | | |
|---|---|---|---|
| 3,549,607 | 12/1970 | Natta et al. ............................ | 526/169 |
| 3,598,796 | 8/1971 | Nutzel et al. ........................ | 526/281 |
| 3,859,265 | 1/1975 | Hepworth ............................ | 526/281 |
| 3,883,495 | 5/1975 | Maertens et al. ..................... | 526/137 |
| 3,974,092 | 8/1976 | Streck et al. ......................... | 526/169 |
| 4,039,491 | 8/1977 | Ikeda et al. ....................... | 260/878 R |
| 4,176,220 | 11/1979 | Ikeda et al. ........................... | 526/114 |

FOREIGN PATENT DOCUMENTS 2437104  2/1975  Fed. Rep. of Germany ........... 526/283

OTHER PUBLICATIONS

Translation (105686/73) Ikeda et al., (56496/75), Nippon Synthetic Rubber, May 17, 1975, "Process of Adj. Mol. Wt. of Norbornene Derivatives".
Chem. Abs. 115459p, "Polymers Crosslinked Through Cyclopentadiene Rings", Takeshita et al., vol. 77, 1972.
Chem. Abs. 148046d, "Molecular Weight Control of Polymers of Norbornene Deriv.", Ikeda et al., vol. 83, 1975.

*Primary Examiner*—Joseph L. Schofer
*Assistant Examiner*—Herbert J. Lilling
*Attorney, Agent, or Firm*—J. Hughes Powell, Jr.; George A. Kap

[57] ABSTRACT

A method for preparing copolymers of a bicycloheptene and 1,3-butadiene is described. The method comprises polymerizing said monomers in a hydrocarbon solvent in the presence of a catalyst mixture comprising:
(a) at least one organoaluminum compound of the formula $R_3Al$ or $R_2AlX$ wherein R is an alkyl radical containing from one to about 12 carbon atoms, and X is a halogen, and
(b) at least one molybdenum salt.

These copolymers can be oil extended and vulcanized to high strength rubbers.

11 Claims, No Drawings

HYDROCARBON-SOLUBLE COPOLYMERS OF BICYCLOHEPTENES AND 1,3-BUTADIENE

BACKGROUND OF THE INVENTION

Cycloolefins can be polymerized through the olefin structure to yield plycycloaliphatics, or through a ring-opening process to yield unsaturated linear polymers. The latter process has particular appeal since the resulting polymers are sulfur-vulcanizable. Examples of patents describing catalysts and catalyst combinations as well as processes for polymerizing cycloolefins include U.S. Pat. Nos. 4,002,815; 4,025,708, 3,853,830; 3,597,403; and 3,778,420.

A number of the catalyst systems which have been suggested in the prior art for preparing polymers of cyclicmonoolefins such as tungsten or molybdenum halides in conjunction with organoaluminum compounds provide linear polymers having a relatively high proportion of gel. More recently, another catalyst system has been discovered which produces linear polymers of cyclicmonoolefins which essentially are gel-free. For example, in U.S. Pat. No. 4,025,708 a solvent is used for the tungsten compound in the catalyst system along with a non-conjugated acyclic olefin has a molecular weight modifier allowing for improved process control and substantially gel-free cyclopentene homopolymers and copolymers.

Dicyclopentadiene is a readily available ethylene production by-product, but not as much consideration has been given in the prior art to homopolymers and copolymers of dicyclopentadiene. Generally it has been observed that the application of broad prior art teachings to the preparation of homopolymers and copolymers of dicyclopentadiene has not been successful and results either in little or no reaction occurring, or if a reaction does occur, the polymer produced is substantially insoluble in hydrocarbon solvents including aliphatic, cycloaliphatic and aromatic hydrocarbons. U.S. Pat. Nos. 3,853,830 and 4,002,815 describe processes for preparing substantially gel-free copolymers of cyclopentene with dicyclopentadiene utilizing a catalyst which comprises at least one compound selected from the group consisting of dialkylaluminum iodides, alkyl-aluminum diiodides and mixtures of trialkylaluminum compounds with elemental iodine, and at least one solvent-soluble or monomer-soluble tungsten compound along with a non-conjugated acyclic olefin. It generally has been reported such as in U.S. Pat. Nos. 4,025,708 and 4,002,815, that in the system described therein, conjugated olefins such as butadiene and isoprene were active inhibitors, and this is why the processes described in those patents required the use of non-conjugated acyclic olefins.

SUMMARY OF THE INVENTION

It now has been found that hydrocarbon soluble copolymers of a bicycloheptene such as a norbornene or a dicyclopentadiene with 1,3-butadiene can be prepared by the method which comprises polymerizing the bicycloheptene and butadiene in a hydrocarbon solvent in the presence of a specific catalyst mixture. The catalyst mixture comprises (a) at least one organoaluminum compound of the formula $R_3Al$ or $R_2AlX$
wherein R is an alkyl radical containing from one to about 12 carbon atoms, and X is a halogen, and (b) at least one molybdenum salt.

The monomer mixture can comprise a bicycloheptene and from 0.01% to about 95% by weight, based on the total polymer weight, of 1,3-butadiene. The copolymers prepared in accordance with this process can be oil extended and exhibit excellent green strength, and can be vulcanized to high tensile strength rubbers.

DESCRIPTION OF THE PREFERRED EMBODIMENTS

The hydrocarbon soluble copolymers of a bicycloheptene and 1,3-butadiene are prepared in accordance with the process of this invention in the presence of a hydrocarbon solvent. The hydrocarbon solvents which are useful include aliphatic or cycloaliphatic hydrocarbon solvents containing from about 4 to 10 carbon atoms such as pentane, hexane, heptane, octane, cyclohexane, octane, cyclohexane and cyclooctane; aromatic hydrocarbon solvents containing 6 to about 14 carbon atoms and which are liquid or easily liquified such as benzene, toluene, naphthalene and the like; and substituted hydrocarbons wherein the substituents are inert such as dichloromethane, chloroform, chlorobenzene, etc. Benzene is found to be an excellent solvent.

The bicycloheptene monomer utilized in the method of the invention has the general formula

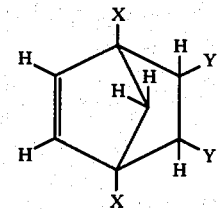

FORMULA I wherein each X and Y may be hydrogen or an alkyl or alkenyl group containing from one to about 20 carbon atoms, and more preferably from about one to five carbon atoms and the two Y groups may jointly represent the group —CH=CH—CH$_2$— thereby forming an additional ring as in dicyclopentadiene. Examples of such bicycloheptenes include dicyclopentadiene, hydrogentated dicyclopentadiene, the norbornene-type compounds such as 2-norbornene (bicyclo[2.2.1]-2-heptene), 5-methyl-2-norbornene, 5,6-dimethyl-2-norbornene, 5-ethyl-2-norbornene, 5-butyl-2-norbornene, 5-vinyl-2norbornene, 5-propenyl-2-norbornene, 5-butenyl-2-norbornene and compounds having the formula

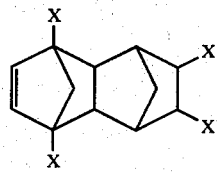

FORMULA II wherein X is hydrogen or an alkyl group containing from one to 20 carbon atoms and preferably from one to about five carbon atoms. Mixtures of two or more of the above described bicycloheptenes can be copolymerized with 1,3-butadiene in accordance with the method of the invention.

Various amounts of 1,3-butadiene can be polymerized with the bicycloheptenes. Generally the monomer mixture will comprise at least one bicycloheptene and from about 0.01% to about 95% by weight, based on the total polymer weight, of the butadiene. The relative amounts of monomers and type of bicycloheptene can be chosen by one skilled in the art to provide a desirable molecular weight or other properties depending on the expected use of the polymer.

The polymerization is conducted in the presence of a catalyst mixture which comprises (a) at least one organoaluminum compound of the formula $R_3Al$ or $R_2AlX$ wherein R is an alkyl group containing from 1 to about 12 carbon atoms and X is a halogen, and (b) a molybdenum salt.

The organoaluminum compounds may be trialkylaluminum or dialkylaluminum monohalides or mixtures thereof. Each alkyl group can contain from 1 to about 12 carbon atoms and more preferably, from about 2 to 4 carbon atoms. Specific examples of such compounds include diethylaluminum iodide, diethylaluminum chloride, diethylaluminum fluoride, dipropylaluminum iodide, ethylpropylaluminum chloride and triethylaluminum. The organoaluminum halide generally is added to the reaction mixture dissolved in a solvent, preferably a hydrocarbon solvent. Generally the hydrocarbon solvent will be the same solvent as used for conducting the polymerization. Examples of such hydrocarbon solvents are given above.

Examples of molybdenum salts which are useful in the invention include the halides such as chlorides, bromides, iodides and fluorides. Specific examples of such halides include molybdenum pentachloride, molybdenum hexachloride, molybdenum pentabromide, molybdenum hexabromide, molybdenum pentaiodide, molybdenum hexaiodide, molybdenum pentafluoride and molybdenum hexafluoride. Molybdenum halogen oxides such as molybdenum dioxydichloride, molybdenum dioxydibromide and molybdenum oxytetrafluoride may be used as well as well as molybdenum alkoxides such as molybdenum pentachloride base ethoxide. Other representative salts are those of acetyl acetonates, sulfates, phosphates, nitrates, etc. which include compounds such as molybdenum acetylacetonate, molybdenum sulfate, molybdenum phosphate, and molybdenum nitrate. Mixtures of these molybdenum salts also can be employed. The more preferred salts are the molybdenum halides, especially molybdenum pentahalides.

The molybdenum salt or salt mixture is employed at a level of from about 0.01 to about 5 millimoles per mole of monomer and more preferably from about 0.1 to about 0.5 millimole per mole of monomer. The organoaluminum compounds of the type described above are used in a molar ratio of organoaluminum compound to molybdenum salts(s) of from about 10:1 to about 1:3.

In a particularly preferred embodiment, the molybdenum salt is dissolved in a solvent prior to incorporation into the monomer mixture. In the absence of a solvent for the molybdenum salt, the polymerization reaction may proceed with some difficulty due to the presence of the insoluble salts. The use of a solvent for the molybdenum salts also results in a brief induction period of from about one to about five minutes after addition of the molybdenum salts to the monomer mixture and allows addition of all components of the reaction mixture before substantial polymerization begins. The result is a more uniform process control, and ultimately, substantially gel-free polymers.

The preferred solvent for the molybdenum compound comprises at least one alkyl ester of a saturated carboxylic or dicarboxylic acid. The ester solvent contains from two to about 20 carbon atoms which may be substituted with from 0 to 3 halogen atoms. More preferably, the ester solvent contains from 2 to about 10 carbon atoms and 0 or 1 bromine or chlorine atoms. The ester solvent should be a liquid under the prevailing reaction conditions in order to maintain the molybdenum compound in solution during the reaction. The concentration of the molybdenum salt in the ester solvent may vary from about 0.1 molar to about 1.0 molar. Examples of suitable alkyl esters of saturated carboxylic acids include methyl formate, ethyl formate, methyl chloroformate, ethyl chloroformate, butyl chloroformate, methyl acetate, ethyl acetate, isopropyl acetate, n-propyl acetate, n-butyl acetate, sec-butyl acetate, t-butyl acetate, isoamyl acetate, n-amyl acetate, hexyl acetate, methyl bromoacetate, ethyl bromoacetate, t-butyl bromoacetate, ethyl chloroacetate, methyl propionate, ethyl propionate, ethyl 2-bromopropionate, ethyl 3-bromopropionate, methyl 2-chloropropionate, ethyl butyrate, ethyl 2-bromobutyrate, ethyl 4-bromobutyrate, ethyl 2-bromoisobutyrate, methyl 4-chlorobutyrate, ethyl 4-chlorobutyrate, ethyl isovalerate, methyl 5-bromovalerate, ethyl 2-bromovalerate, ethyl 5-bromovalerate, methyl 5-chlorovalerate, ethyl caproate, ethyl octanoate, ethyl decanoate, ethyl laurate, diethyl oxalate, dimethyl malonate, diethyl malonate, diethyl methylmalonate, diethylethylmalonate, diethyl n-burylmalonate, diethyl dimethylmalonate, diethyl diethylmalonate, diethyl bromomalonate, diethyl chloromalonate, diethyl succinate, diethyl glutarate, diethyl pimelate diethyl suberate, adipic acid monomethyl ester, and the like.

The more preferred solvents contain from 2 to 5 carbon atoms and these include methyl formate, ethyl formate, methyl chloroformate, ethyl chloroformate, butyl chloroformate, methyl acetate, ethyl acetate, isopropyl acetate, n-propyl acetate, methyl bromoacetate, ethyl bromoacetate, ethyl chloroacetate, methyl propionate, ethyl propionate, ethyl 2-bromopropionate, ethyl 3-bromopropionate, methyl 2-chloropropionate, dimethyl malonate, and the like. Excellent results are obtained with ethyl acetate.

The above ester solvents may be used together with at least one inert cosolvent. The cosolvent may constitute from 0% to about 90% by weight of the total catalyst solvent weight, and additional cosolvent may be used during polymerization. The additional cosolvent may be up to about 1000 times and more, preferably up to about 500 times, the total catalyst solvent weight. Suitable inert cosolvents include aliphatic or cycloaliphatic hydrocarbons containing 4 to 10 carbon atoms such as pentane, hexane, heptane, octane, cyclohexane and cyclooctane; aromatic hydrocarbons containing 6 to 14 carbon atoms and which are liquid or easily liquified such as benzene, toluene and naphthalene; and substituted hydrocarbons wherein the substituents are inert, such as dichloromethane, chloroform, chlorobenzene and the like. Benzene and toluene are found to be excellent cosolvents.

A polymerization activator may be used but is not generally needed. Examples of activators include water, methanol, ethanol, isopropyl alcohol, benzyl alcohol, phenol, ethyl mercaptan, 2-chloroethanol, 1,3-dichloropropanol, p-bromophenol, epichlorohydrin, ethylene oxide, cyclopentene-2-hydroperoxide, cumyl hydroperoxide, tertiary butyl peroxide, benzoyl peroxide, and air or oxygen. Excellent activation is obtained by using air or a peroxide or hydroperoxide, especially by using the organic peroxides such as benzoyl peroxide.

The activator may be employed in a range from about 0 moles to about 3 moles per mole of organoaluminum compound and more preferably from about 0 to about 1 mole per mole. The activator may be added at any point in the charge procedure, but it is more preferably added last.

The monomers (butadiene and bicycloheptenes) may be added at any point in the charging procedure. Normally, the monomers are added to the reactor which already contains the solvent. These materials may be added separately or as a mixture of materials. The molybdenum and organoaluminum catalysts then are added as a mixture or separately in any order, but usually in solution in a solvent as described heretofore. More preferably, the molybdenum salt is dissolved in an ester solvent of the type described above and the organoaluminum compound is dissolved in a solvent which is the solvent used for the polymerization reaction.

The polymerization reaction may be preformed as a batch or continuous process but always in the presence of a solvent. The reaction mixture in the reactor vessel may be cooled or heated to polymerization temperature as the start of the additions or at any point during the addition of the various reactants. Generally, polymerization temperatures of from about −80° C. to about 100° C. are utilized although the reaction generally proceeds satisfactorily at about room temperature. If desired, the polymerization can be short-stopped by addition of alcohols, amines or carboxylic acids such as ethanol, t-butyl phenol, diethylamine, acetic acid, etc.

At the conclusion of the polymerization reaction, the polymer or copolymer may be isolated by any of the methods known in the art such as by direct drying under reduced pressure, by precipitation using an alcohol such as methanol, ethanol, or isoproponol, or by steam or by hot water stripping. The polymer is recovered and may be washed further with alcohol or water and then dried. The hydrocarbon soluble polymers obtained by this method are smooth, syrupy polymers.

The following examples illustrate the methods of the present invention. It should be understood that the Examples are set forth for illustrative and not restrictive purposes. Unless otherwise indicated, all parts and percentages are by weight.

EXAMPLES 1–7

A 0.20 molar molybdenum pentachloride solution is prepared under a nitrogen atmosphere by dissolving, for example, 2.217 grams of molybdenum pentachloride in 40 ml. of ethyl acetate. Dicyclopentadiene (DCPD) or 5-methyl norbornene are copolymerized with 1,3-butadiene by the following procedures utilizing glass reactor vessels. Each vessel is cleaned with soap and water, rinsed with acetone, heated in an oven at 140° C. and flushed with nitrogen. The monomers are mixed with benzene and charged to the reactor vessel. The 1,3-butadiene is added followed by addition of a 0.5 molar solution of the organoaluminum compound in benzene and the 0.2 molar solution of a molybdenum pentachloride in an ethyl acetate and benzene mixture (1:4).

The polymerizations are performed at about room temperature with stirring and produce little heat. The polymerization reactions proceed to completion in a short time and produce very viscous smooth cements. The grams and moles of reactants, yields and other properties are set forth in Table I. The dilute solution viscosity (DSV) is measured at a concentration of 0.1 gram in 100 ml. of toluene at 25° C.

TABLE I

| Example | 1 | 2 | 3 | 4 | 5 | 6 | 7 |
|---|---|---|---|---|---|---|---|
| 5-Methyl-2-Norbornene (-grams) | 4.38 | 5.1 | 5.19 | — | 38.12 | — | 4.25 |
| DCPD(grams) | — | — | — | 4.74 | — | 40.1 | — |
| 1,3-Butadiene(grams) | 0.1 | 0.2 | 1.2 | 0.02 | 29.63 | 29.80 | 4.1 |
| Benzene(ml) | 45 | 50 | 50 | 45 | 400 | 400 | 95 |
| Et$_2$AlI(ml) | 0.2 | — | — | 0.2 | — | — | — |
| Et$_2$Al Cl(ml) | — | 0.4 | 0.4 | — | 2.5 | 2.0 | 0.4 |
| Et$_3$Al(ml) | — | — | — | — | 2.0 | 2.0 | 0.3 |
| MoCl$_5$(ml) | 0.1 | 0.2 | 0.2 | 0.1 | 4.0 | 4.0 | 0.2 |
| Time(min.) | 3 | 8 | 10 | 30 | 23(hrs) | 24(hrs) | 19(hrs) |
| Polymer yield(grams) | 4.50 | 5.3 | 5.6 | 1.9 | 42.0 | 33.3 | 3.08 |
| DSV | 2.18 | 4.61 | 1.84 | — | 1.021 | — | 2.95 |

EXAMPLE 8

The procedure of Example 1 is repeated except that the diethylaluminum iodide is replaced by an equivalent amount of ethylisopropylaluminum iodide.

EXAMPLE 9

The procedure of Example 1 is repeated except that the molybdenum pentachloride is replaced by an equivalent amount of molybdenum pentaiodide.

EXAMPLE 10

The procedure of Example 3 is repeated except that the 5-methyl norbornene is replaced by an equivalent amount of norbornene.

The copolymers prepared in accordance with the invention can be oil extended with paraffinic, naphthenic and aromatic type oils, and mixed with carbon black to give vulcanizates which have excellent properties. The raw polymers have a high degree of green strength. These properties allow the copolymers of the invention to be used in a variety of applications. They can be employed alone as tire tread or carcass stock or blended with other rubbers or plastics. They can be used to improve the tack and green strength of rubbers such as butadiene/styrene emulsion copolymers, cis-polybutadiene and other solution-polymerized conjugated diene polymers. The polymers of the invention also can be used in cement and adhesive formulations. In the above applications, the copolymers of the invention can be compounded and cured with conventional fillers, extenders, plasticizers antioxidants, cure accelerators, cross linking or curing agents, pigments and stabilizers.

The copolymers of the invention, when not compounded with oil, have desirable plastic properties such as high impact strength. The copolymers can be readily processed such as by mill blending, Banbury mixing, calendering, extrusion, molding, etc.

The embodiments of the invention in which an exclusive property or privilege is claimed are defined as follows:

1. A process for preparing substantially gel-free hydrocarbon-soluble copolymers of a bicycloheptene and 1,3-butadiene whereby bicycloheptene is selected from monomers defined by Formula I as follows:

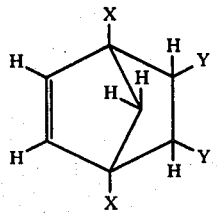

wherein each X and Y is hydrogen or an alkyl or alkenyl group containing from one to 20 carbon atoms, or the two Y groups jointly represent the group —CH=CH—CH$_2$— thereby forming an additional ring, and Formula II as follows:

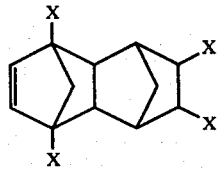

wherein X is hydrogen or an alkyl group containing one to 20 carbon atoms, or mixtures of said bicycloheptenes, said process comprising polymerizing a monomer mixture of at least one bicycloheptene and from about 0.01% to about 95% by weight, based upon the total polymer weight, of 1,3-butadiene in a hydrocarbon solvent in the presence of a catalyst mixture consisting essentially of (a) at least one organoaluminum compound of the formula R$_3$Al or R$_2$AlX wherein R is an alkyl group containing from 1 to about 12 carbon atoms, and X is a halogen, and (b) at least one molybdenum salt.

2. The process of claim 1 wherein the organoaluminum compound is dialkyl aluminum halide.

3. The process of claim 1 wherein molybdenum salt is a molybdenum halide.

4. The process of claim 1 wherein the catalyst mixture contains a mixture of a dialkylaluminum halide, a trialkylaluminum and a molybdenum halide.

5. The process of claim 2 wherein the aluminum halide is a diethylaluminum halide.

6. The process of claim 3 wherein the molybdenum halide is molybdenum pentachloride.

7. The process of claim 1 wherein the bicycloheptene is a norbornene.

8. The process of claim 1 wherein the bicycloheptene is dicyclopentadiene.

9. The process of claim 1 wherein the polymerization is conducted in the presence of a solvent for the bicycloheptene, butadiene and the catalysts.

10. Copolymers prepared in accordance with the process of claim 1.

11. The process of claim 1 wherein the molybdenum salt of (b) is dissolved in an alkyl ester of a saturated carboxylic or dicarboxylic acid.

* * * * *